(12) United States Patent
Belov

(10) Patent No.: US 10,691,649 B2
(45) Date of Patent: Jun. 23, 2020

(54) METHOD AND SYSTEM FOR MANAGING DATA ASSOCIATED WITH A HIERARCHICAL STRUCTURE

(71) Applicant: YANDEX EUROPE AG, Lucerne (CH)

(72) Inventor: Mikhail Vladimirovich Belov, Vladimir (RU)

(73) Assignee: YANDEX EUROPE AG, Lucerne (CH)

(*) Notice: Subject to any disclaimer, the term of this patent is extended or adjusted under 35 U.S.C. 154(b) by 347 days.

(21) Appl. No.: 15/531,451

(22) PCT Filed: Nov. 18, 2015

(86) PCT No.: PCT/IB2015/058931
§ 371 (c)(1),
(2) Date: May 29, 2017

(87) PCT Pub. No.: WO2017/001903
PCT Pub. Date: Jan. 5, 2017

(65) Prior Publication Data
US 2017/0270138 A1    Sep. 21, 2017

(30) Foreign Application Priority Data
Jun. 30, 2015  (RU) ............................... 2015125830

(51) Int. Cl.
*G06F 16/00* (2019.01)
*G06F 16/185* (2019.01)
(Continued)

(52) U.S. Cl.
CPC .......... *G06F 16/185* (2019.01); *G06F 16/137* (2019.01); *G06F 16/16* (2019.01)

(58) Field of Classification Search
CPC ....... G06F 16/185; G06F 16/137; G06F 16/16
See application file for complete search history.

(56) References Cited

U.S. PATENT DOCUMENTS 5,890,147 A * 3/1999 Peltonen ................. G06F 16/10
6,965,903 B1 11/2005 Agarwal et al.
(Continued)

OTHER PUBLICATIONS

International Search Report with regard to PCT/IB2015/058931 dated Feb. 5, 2016.
(Continued)

*Primary Examiner* — Tarek Chbouki
(74) *Attorney, Agent, or Firm* — BCF LLP

(57) ABSTRACT

A computer-implemented method (500, 600, 700) and a system (210) for managing data according to a hierarchical data structure. The method allows storing data associated with a path and a file, the method comprising accessing the data; for at least one of path elements associated with the data, storing, in a hierarchy table (404) (i) a hierarchy identifier; (ii) an independent hierarchy table identifier; and (iii) a parent hierarchy table identifier. For at least one of the path elements and the file associated with the data, the method stores, in a file table (402), (i) an independent file table identifier; and (ii) a parent file table identifier associated with an independent file table identifier of a parent path element from which the at least one of the path elements and the file depends.

15 Claims, 6 Drawing Sheets

(51) Int. Cl.
*G06F 16/13* (2019.01)
*G06F 16/16* (2019.01)

(56) References Cited

U.S. PATENT DOCUMENTS

| | | | |
|---|---|---|---|
| 7,191,182 B2 | 3/2007 | Anonsen et al. | |
| 7,366,708 B2 | 4/2008 | Jalali et al. | |
| 7,882,071 B2* | 2/2011 | Fachan | G06F 16/174 |
| | | | 707/649 |
| 8,782,116 B2* | 7/2014 | Nassor | G06F 16/51 |
| | | | 709/201 |
| 8,838,984 B2 | 9/2014 | Aharonov et al. | |
| 2003/0033285 A1 | 2/2003 | Jalali et al. | |
| 2003/0140051 A1* | 7/2003 | Fujiwara | H04L 67/1097 |
| 2004/0220965 A1 | 11/2004 | Harville et al. | |
| 2006/0064428 A1 | 3/2006 | Colaco et al. | |
| 2006/0117049 A1 | 6/2006 | Jain et al. | |
| 2007/0118561 A1 | 5/2007 | Idicula et al. | |
| 2007/0198545 A1 | 8/2007 | Ge et al. | |
| 2008/0263008 A1 | 10/2008 | Beyer et al. | |
| 2009/0271412 A1* | 10/2009 | Lacapra | H04L 67/104 |
| 2009/0271418 A1* | 10/2009 | Vaghani | G06F 11/1435 |
| 2009/0307241 A1 | 12/2009 | Schimunek et al. | |
| 2013/0297848 A1 | 11/2013 | Brocco et al. | |
| 2014/0122529 A1* | 5/2014 | Frieder | G06F 17/2241 |
| | | | 707/778 |

OTHER PUBLICATIONS

International Preliminary Report on Patentability with regard to PCT/IB2015/058931 dated Oct. 4, 2016.
Ben-Gan et al., "Advanced Transact-SQL for SQL Server 2000", Books for professionals by professionals, APPRES, 2000, ISBN (pbk): 1-893115-82-8, pp. 1-574.

* cited by examiner

500

502 ACCESSING, FROM A NON-TRANSITORY COMPUTER-READABLE MEDIUM, THE DATA

504 FOR AT LEAST ONE OF THE PATH ELEMENTS ASSOCIATED WITH THE DATA, STORING, IN A HIERARCHY TABLE ACCESSIBLE FROM THE NON-TRANSITORY COMPUTER-READABLE MEDIUM, (I) A HIERARCHY IDENTIFIER ASSOCIATED WITH A SUB-PATH TO THE AT LEAST ONE OF THE PATH ELEMENTS IN THE HIERARCHICAL DATA STRUCTURE; (II) AN INDEPENDENT HIERARCHY TABLE IDENTIFIER UNIQUELY IDENTIFYING THE AT LEAST ONE OF THE PATH ELEMENTS IN THE HIERARCHY TABLE; AND (III) A PARENT HIERARCHY TABLE IDENTIFIER ASSOCIATED WITH AN INDEPENDENT HIERARCHY TABLE IDENTIFIER OF A PARENT PATH ELEMENT FROM WHICH THE AT LEAST ONE OF THE PATH ELEMENTS DEPENDS

506 FOR AT LEAST ONE OF THE PATH ELEMENTS AND THE FILE ASSOCIATED WITH THE DATA, STORING, IN A FILE TABLE ACCESSIBLE FROM THE NON-TRANSITORY COMPUTER-READABLE MEDIUM, (I) AN INDEPENDENT FILE TABLE IDENTIFIER UNIQUELY IDENTIFYING THE AT LEAST ONE OF THE PATH ELEMENTS AND THE FILE IN THE FILE TABLE; (II) A PARENT FILE TABLE IDENTIFIER ASSOCIATED WITH AN INDEPENDENT FILE TABLE IDENTIFIER OF A PARENT PATH ELEMENT FROM WHICH THE AT LEAST ONE OF THE PATH ELEMENTS AND THE FILE DEPENDS

*FIG. 5*

METHOD AND SYSTEM FOR MANAGING DATA ASSOCIATED WITH A HIERARCHICAL STRUCTURE

CROSS-REFERENCE

The present application is a U.S. national stage entry of International Patent Application No. PCT/IB2015/058931, filed on Nov. 18, 2015, entitled "METHOD AND SYSTEM FOR MANAGING DATA ASSOCIATED WITH A HIERARCHICAL STRUCTURE" which claims priority to Russian Patent Application No 2015125830, filed Jun. 30, 2015, entitled "METHOD AND SYSTEM FOR MANAGING DATA ASSOCIATED WITH A HIERARCHICAL STRUCTURE" the entirety of which is incorporated herein.

FIELD

The present technology relates to systems and methods for managing data associated with a hierarchical data structure. In particular, the systems and methods aim at storing, retrieving and/or updating data associated with a path and a file, the path defining a relationship between the file and a hierarchical data structure.

BACKGROUND

With the advent of computer systems, techniques have been developed to reflect a human desire to categorize information according to a hierarchical organization. Categories in which information is typically organized may be themselves organized relative to each other in some form of hierarchy defining the hierarchical organization.

As an example, computer file systems are typically implemented using hierarchy-based organisation principles. A typical computer file system has directories arranged in a hierarchy and documents stored in the directories. Ideally, hierarchical relationships between the directories reflect some intuitive relationship between the meanings that have been assigned to the directories. Similarly, it might be desirable for each document to be stored in a directory based on some intuitive relationship between the contents of the document and the meaning assigned to the directory in which the document is stored.

An example of a typical file system 300 is provided at FIG. 3. The illustrated file system 300 includes a root directory 302 entitled "/". The root directory 302 defines a beginning of a path to a directory or to a document stored in a directory. The root directory 302 is associated in a child-parent relationship with a folder 304 entitled "folder A" and a folder 310 entitled "folder D". The folder 304 is in a child-parent relationship with a folder 306 entitled "folder B" and in a child-parent relationship with a file 308 entitled "file C". The folder 310 is in a child-parent relationship with a file 312 entitled "file E". In the example illustrated at FIG. 3, the folders 304, 306 and 310 are directory files (also referred to as "folder files") whereas the files 308 and 312 are document files.

When electronic information is organized in a hierarchy, each item (e.g., a directory file or a document file), may be identified by the path through the hierarchy to the item. Within a hierarchical file system, the path to an item begins at a root directory (e.g., the root directory 302) and proceeds down the hierarchy of directories to arrive at the directory that contains the item of interest. For example, the path to file 308 consists of folders 302, 304, in that order.

Hierarchical storage systems may allow different items to have a same name. As an example, the files 308 and 312 of FIG. 3 may have a same name. Consequently, to unambiguously identify a given document, more than just the name of the document is required. An example of way to identify and locate a specific item of information stored in a hierarchical storage system might be through the use of a "pathname". A pathname is composed of a sequence of names, referred to as path elements. In the context of a file system, each name in the sequence of names is a "filename". The term "filename" refers to both the names of directories and the names of documents since both directories and documents are considered to be "files". Within a file system, the sequence of filenames in a given pathname begins with the name of the root directory, includes the names of all directories along the path from the root directory to the items of interest. Typically, the list of directories to traverse is concatenated together, typically with separator punctuation (e.g., "/", "\", or ";") to make a pathname. Thus, a pathname for the file 308 may be "/folder A/file C" and a pathname for the file 312 may be "/folder D/file E".

The relationship between directories and their contained content may vary between different types of hierarchically organized systems. As a first example, Microsoft Windows™ and DOS file systems require each file to have exactly one parent, thereby forming a tree model. As a second example, UNIX file systems may allow files to have multiple parents, thereby forming a graph model.

In contrast to hierarchical approaches to organizing electronic information, a database (e.g., a relational database) stores information in tables comprising rows and columns. Each row may represent a particular record and may be identified by a unique ID. Each column may represent an attribute or a field of the record. Data may then be retrieved from the database by submitting queries to a database server that manages the database.

Each one of the hierarchical file system and the relational database has advantages and limitations.

A hierarchically organized storage system may be simple, intuitive, easy to implement and may be a standard model used by most application programs. Unfortunately, the simplicity of the hierarchical organization does not provide the support required for complex data retrieval operations. For example, the contents of every directory may have to be inspected to retrieve all documents created on a particular date that have a particular filename. Since all directories may have to be searched, the hierarchical organization may be limited in providing a fast retrieval process.

A relational database system may be well suited for storing large amount of information and for accessing data in a flexible manner relative to hierarchically organized systems, data that matches even complex search criteria may be easily and efficiently retrieved from a relational database system. However, the process of formulating and submitting queries to a database server may be less intuitive than merely traversing a hierarchy of directories.

To alleviate the limitations of hierarchical file systems and relational databases, some attends have been made to develop relationally organized systems that allow the systems to emulate a hierarchically organized system. This type of emulation may be particularly desirable when the storage capability and flexibility of a relational system is needed but the intuitiveness and ubiquity of the hierarchical system is desired.

As a first example of an attend to alleviate the limitations set forth above, relational databases compatible with the Structured Query Language (SQL) may rely on a connect-by clause to allow a user to issue queries that request data based on a hierarchical organization. The connect-by clause may be used to specify one or more conditions that define a hierarchical relationship upon which a hierarchical organization is based. However, using connect-by clauses to formulate queries may present disadvantages including (i) computing resources needed for the database server to process such queries; and (ii) complexity of incorporating connect-by clauses into queries usually already complex to formulate.

As a second example, U.S. Pat. No. 7,366,708 teaches a method of and a system for storing hierarchical data in a relational database. Under the depicted approach, information about all children of a given element is stored in a record of this given element. In addition, independent IDs are relied upon to uniquely identify both parent and child elements. Even though this approach provides a fast way to identify children of a given element, it may still present at least some disadvantages, for example, in case of migration of elements from one node of the hierarchical organization to another node of the hierarchical organization.

In addition to the above described first and second examples, other approaches to the storing of hierarchical data in a relational database have been developed. Such other approaches may be divided between so called "hierarchical way" and "ID way".

Under the hierarchical way approach, each element of a hierarchical structure has its own ID that never changes and a link to a parent element. Under the hierarchical way approach, operations on elements of the hierarchical structure have a computational complexity of O(M), where M is a level of a particular element in the hierarchical structure on which one or more operations have to be conducted. As a result, a complexity of an operation depends on a depth of the hierarchical structure thereby resulting in potentially expensive operations from a computing resources standpoint, for example in case of migration of elements from one node of the hierarchical organization to another node of the hierarchical organization.

Under the ID way approach, each element of a hierarchical structure has an ID which depends on a path in the hierarchical structure (e.g., from a root of the structure to the element) and a link to a parent element. Under the ID way approach, operations on elements of the hierarchical structure have a computational complexity of O(1) but at the expense of limited and/or complex movements of elements within the hierarchical structure as all IDs of child elements of an element being moved have to be modified. As a result, for large and complex hierarchical structure, such operations may also result in expensive operations from a computing resources standpoint.

SUMMARY

Embodiments of the present technology have been developed based on developers' appreciation of at least one shortcoming associated with the prior art.

As depicted before, even though multiple methods and systems for storing hierarchical data in a database have been developed, improvements may still be desirable, in particular improvements aiming at providing an efficient way of managing movements of elements within a hierarchical structure stored in a database such as, for example, a relational database. Such improvements may become even more desirable when the amount of data reaches a certain size and/or the complexity of the hierarchical structure reach a certain level. Such improvements may become desirable to increase a processing speed of data stored in the database and/or decrease a required computational power to process such data stored in the database.

The present technology arises from an observation made by the inventor(s) that storing data associated with a hierarchical structure in a database may be achieved by relying on a hierarchy table and a file table, each storing certain data fields. As a result, under certain circumstances, a change in an organization of the hierarchy structure (e.g., a position of a directory file modified in the hierarchy structure) may be reflected in the database by updating the hierarchy table, sometimes independently of an update of the file table. Under certain circumstances, because the data associated with the hierarchical structure is stored in the database under a first collection of data fields in the hierarchy table and under a second collection of data fields in the file table, entries of the file table corresponding to child elements dependent from a directory file to be moved do not need to be updated. Such approach may reduce a computational complexity and/or an amount of time required to complete such an update in the database hosting the hierarchy table and/or the file table as only the hierarchy table may need to be updated. Other benefits may also become apparent to the person skilled in the art of the present technology further to the reading of the description of the technology set forth below.

In one aspect, various implementations of the present technology provide computer-implemented method of storing data associated with a path and a file, the path defining a relationship between the file and a hierarchical data structure, the path comprising a sequence of path elements, each one of the path elements defining a node in the hierarchical data structure, the method for execution by a processor, the method comprising:

accessing, from a non-transitory computer-readable medium, the data;

for at least one of the path elements associated with the data, storing, in a hierarchy table accessible from the non-transitory computer-readable medium, (i) a hierarchy identifier associated with a sub-path to the at least one of the path elements in the hierarchical data structure; (ii) an independent hierarchy table identifier uniquely identifying the at least one of the path elements in the hierarchy table; and (iii) a parent hierarchy table identifier associated with a hierarchy identifier of a parent path element from which the at least one of the path elements depends; and for at least one of the path elements and the file associated with the data, storing, in a file table accessible from the non-transitory computer-readable medium, (i) an independent file table identifier uniquely identifying the at least one of the path elements and the file in the file table; and (ii) a parent file table identifier associated with an independent file table identifier of a parent path element from which the at least one of the path elements and the file depends.

In some implementations, the hierarchy identifier is generated by applying a hash function to the sub-path.

In some further implementations, the sub-path is a complete path between a root of the hierarchical data structure and the node defined by the at least one of the path elements.

In some implementations, the method further comprises, for the at least one of the path elements and the file associated with the data, storing, in the file table accessible from the non-transitory computer-readable medium, (iii) an independent parent file table identifier associated with an independent file table identifier associated with a parent path element from which the at least one of the path elements and the file depends.

In some further implementations, the method further comprises, for the at least one of the path elements and the file associated with the data, storing, in the file table accessible from the non-transitory computer-readable medium, (iv) a text stream defining a name associated with the at least one of the path elements and the file.

In some implementations, the parent file table identifier is generated based on (i) the independent file table identifier associated with the parent path element and (ii) a name associated with the at least one of the path elements and the file.

In some further implementations, the at least one of the path elements is a directory file.

In some implementations, the file defines a leaf in the hierarchical structure and the directory file defines a node in the hierarchical structure.

In some further implementations, the hierarchy table and the file table are implemented via a relational database.

In another aspect, various implementations of the present technology provide computer-implemented method of retrieving data associated with a path and a file, the path defining a relationship between the file and a hierarchical data structure, the path comprising a sequence of path elements, each one of the path elements defining a node in the hierarchical data structure, the method for execution by a processor, the method comprising:
   accessing, from a non-transitory computer-readable medium, a hierarchy table and file table;
   generating a hierarchy identifier based on the path;
   identifying, in the hierarchy table, at least one entry corresponding to the hierarchy identifier; and
   identifying, in the file table, at least one entry having a parent file table identifier corresponding to a parent hierarchy table identifier associated with the at least one entry corresponding to the hierarchy identifier.

In some implementations, generating the hierarchy identifier comprises applying a hash function to the path.

In some further implementations, the hierarchy table is structured so that:
   (i) the hierarchy identifier is associated with a sub-path to one of the path elements in the hierarchical data structure;
   (ii) an independent hierarchy table identifier uniquely identifies the one of the path elements in the hierarchy table; and
   (iii) the parent hierarchy table identifier is associated with a hierarchy identifier of a parent path element from which the one of the path elements depends.

In some implementations, the file table is structured so that:
   (i) an independent file table identifier uniquely identifies one of the path elements and the file in the file table; and
   (ii) the parent file table identifier is associated with an independent file table identifier of a parent path element from which the one of the path elements and the file depends.

In another aspect, various implementations of the present technology provide a computer-implemented method of updating data associated with a path and a file, the path defining a relationship between the file and a hierarchical data structure, the path comprising a sequence of path elements, each one of the path elements defining a node in the hierarchical data structure, the method for execution by a processor, the method comprising:
   detecting a modification in the sequence of path elements, the modification being indicative of the sequence of path elements before modification and indicative of the sequence of path elements after modification;
   accessing, from a non-transitory computer-readable medium, a hierarchy table, the hierarchy table containing data relating to the path, the data being independent from a file table containing data relating to the file;
   generating a first hierarchy identifier based on the sequence of path elements before modification;
   generating a second hierarchy identifier based on the sequence of path elements after modification;
   identifying, in the hierarchy table, at least one entry corresponding to the first hierarchy identifier; and
   replacing, in the hierarchy table, the at least one entry with the second hierarchy identifier.

In some implementations, updating data associated with a path and a file is performed without modifying a content of the file table.

In some further implementations, the hierarchy table is structured so that:
   (i) a hierarchy identifier is associated with a sub-path to one of the path elements in the hierarchical data structure;
   (ii) an independent hierarchy table identifier uniquely identifies one of the path elements in the hierarchy table; and
   (iii) a parent hierarchy table identifier is associated with a hierarchy identifier of a parent path element from which the one of the path elements depends.

In other aspects, various implementations of the present technology provide a non-transitory computer-readable medium storing program instructions for storing data associated with a path and a file and/or retrieving data associated with a path and a file and/or updating data associated with a path and a file, the program instructions being executable by a processor of a computer-based system to carry out one or more of the above-recited methods.

In other aspects, various implementations of the present technology provide a computer-based system, such as, for example, but without being limitative, an electronic device comprising at least one processor and a memory storing program instructions for storing data associated with a path and a file and/or retrieving data associated with a path and a file and/or updating data associated with a path and a file, the program instructions being executable by one or more processors of the computer-based system to carry out one or more of the above-recited methods.

In the context of the present specification, unless expressly provided otherwise, an "electronic device", a "server", "remote server", and a "computer-based system" are any hardware and/or software appropriate to the relevant task at hand. Thus, some non-limiting examples of hardware and/or software include computers (servers, desktops, laptops, netbooks, etc.), smartphones, tablets, network equipment (routers, switches, gateways, etc.) and/or combination thereof.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a file could include the file itself (i.e. its contents), or it could be a unique file descriptor identifying the file with respect to a particular file system, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 5 is a flowchart illustrating a first computer-implemented method implementing embodiments of the present technology;

Figure 1:
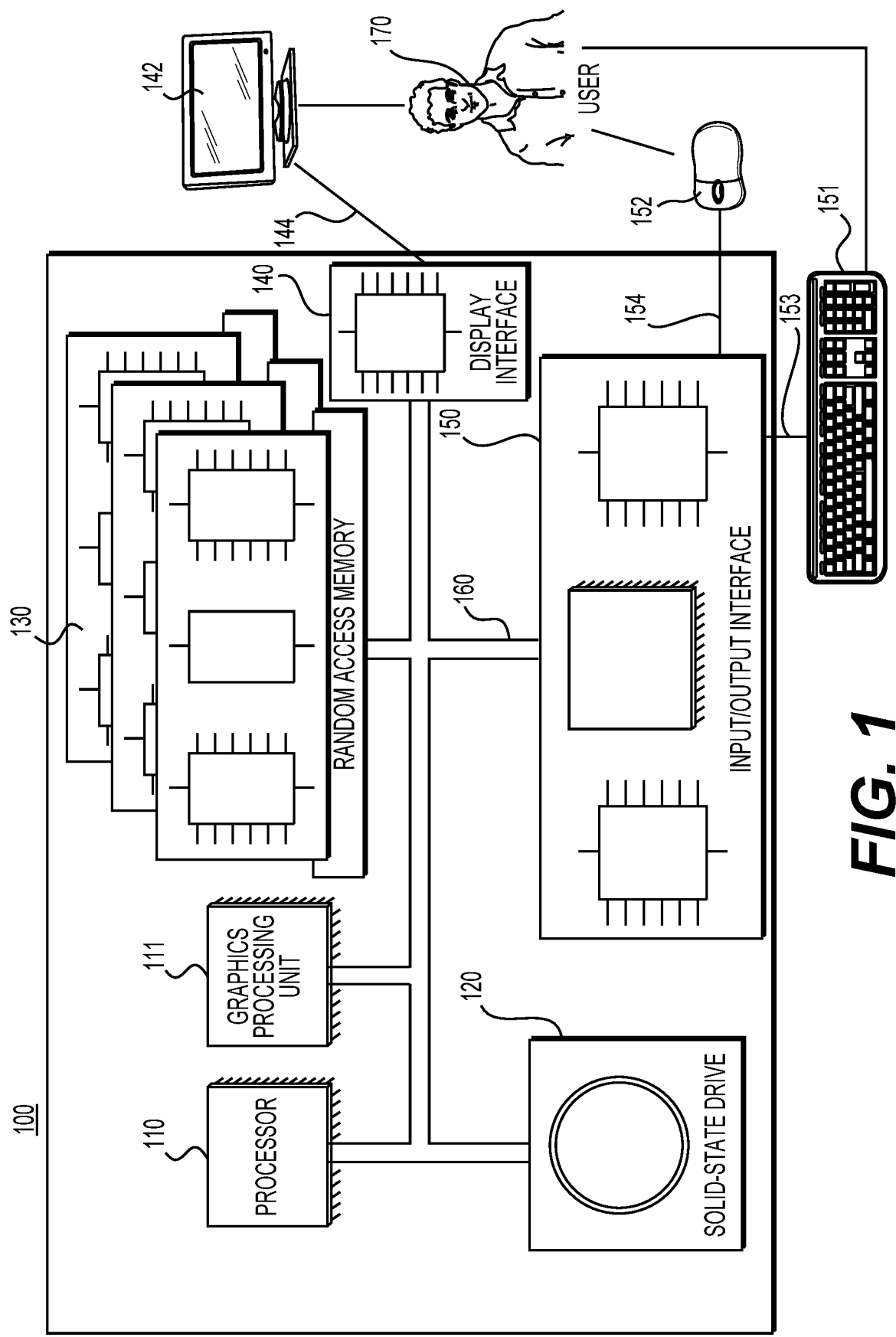
FIG. 1 is a diagram of a computer system suitable for implementing the present technology and/or being used in conjunction with implementations of the present technology.

It should also be noted that, unless otherwise explicitly specified herein, the drawings are not to scale.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Referring to FIG. 1, there is shown a computer system 100 suitable for use with some implementations of the present technology, the computer system 100 comprising various hardware components including one or more single or multi-core processors collectively represented by processor 110, a graphics processing unit (GPU) 111, a solid-state drive 120, a random access memory 130, a display interface 140, and an input/output interface 150.

Communication between the various components of the computer system 100 may be enabled by one or more internal and/or external buses 160 (e.g. a PCI bus, universal serial bus, IEEE 1394 "Firewire" bus, SCSI bus, Serial-ATA bus, etc.), to which the various hardware components are electronically coupled. The display interface 140 may be coupled to a monitor 142 (e.g. via an HDMI cable 144) visible to a user 170, and the input/output interface 150 may be coupled to a touchscreen (not shown), a keyboard 151 (e.g. via a USB cable 153) and a mouse 152 (e.g. via a USB cable 154), each of the keyboard 151 and the mouse 152 being operable by the user 170.

According to implementations of the present technology, the solid-state drive 120 stores program instructions suitable for being loaded into the random access memory 130 and executed by the processor 110 and/or the GPU 111. For example, the program instructions may be part of a library or an application.

Figure 2:
FIG. 2 is a diagram of a database hosted on a database server in accordance with an embodiment of the present technology.

In FIG. 2, there is shown a computer-implemented system 200 comprising a database server 202 and a database 204. The database server 202 can be implemented as a conventional computer server or, alternatively, as a computer server specifically dedicated to database management. In an example of an embodiment of the present technology, the database server 202 can be implemented as a Dell™ PowerEdge™ Server running the Microsoft™ Windows Server™ operating system. Needless to say, the database server 202 can be implemented in any other suitable hardware and/or software and/or firmware or a combination thereof. In the depicted non-limiting embodiment of present technology, the database server 202 is a single server. In alternative non-limiting embodiments of the present technology, the functionality of the database server 202 may be distributed and may be implemented via multiple servers.

The implementation of the database server 202 is well known to the person skilled in the art of the present technology. However, briefly speaking, the database server 202 comprises a communication interface (not depicted) structured and configured to communicate with various entities (not depicted) via a network (not depicted). The database server 202 further comprises at least one computer processor (not depicted) operationally connected with the communication interface and structured and configured to execute various processes to be described herein. In some embodiments, the database server 202 may include at least some of the components of the computer system 100 depicted in FIG. 1.

The general purpose of the database server 202 is to provide database services to other computer programs and/or computing devices, for example computing devices interacting with the database server 202 via the network. In some embodiments, the database server 202 hosts a database management system to provide functionalities and to allow operations to be conducted in the database 204. In some embodiments, the database server 202 may be configured so as to be interacting with other computer programs and/or computing devices in accordance with a client-server model to provide access to the database 204. In some embodiments, the database server 202 may host a database management system (DBMS). In some embodiments, the database server 202 may host a front-end module receiving request to access the database 204 from an electronic device and/or returning results to the electronic device. The database server 202 may also host a back-end module managing data of the database 204 by allowing access to existing data, modification to existing data and/or addition of data. The back-end module may also be configured to as to operate in accordance with one or more query language (e.g., SQL) and process one or more queries and execute appropriate operations in the database 204 to store and/or retrieve and/or update data of the database 204. In some embodiments, the front-end module and/or the back-end module, alone or in combination, may execute instructions to implement the present technology and in particular the storing and/or retrieving and/or updating of hierarchical data in the database 204. Even though the front-end module and/or the back-end module may execute the instructions to implement the present technology, such configuration should not be construed as being limitative, multiple variations as to how the present technology may be implemented and how the storing and/or retrieving and/or updating of hierarchical data in the database 204 may be managed may be envisioned without departing from the scope of the present technology. Further details regarding how the hierarchical data is stored and/or retrieved and/or updated in the database 204 is provided in connection with the description of FIG. 3 to FIG. 7 included herein below.

In some embodiments, the database server 202 may be a proprietary database server such as Oracle™, DB2™, Informix™ and/or Microsoft™ SQL Server. In some embodiments, the database server 202 may be non-proprietary database server such as a GNU General Public License database server, for example, but without being limited thereto, Ingres and/or MySQL. This aspect is not limitative and other embodiments may become apparent to the person skilled in the present technology without departing from the scope of the present technology.

In some embodiments, the database 204 is hosted on the database server 202. In some other embodiments, the database 204 is hosted on a different server while remaining remotely controlled by the database server 202. In some embodiments, the database 204 may be spread over multiple servers and/or multiple database servers (e.g., a first table of the database 204 may be hosted on a first database server and a second table of the database 204 may be hosted on a second database server). In some embodiments, the database 204 is implemented so a to be a relational database comprising data table organized in accordance with a relational model. Even though FIG. 2 depicts a relational database, it should not be construed as being limitative. In some other embodiments, the database 204 is implemented as an object database or as an object-relational database. In yet some other embodiments, the database 204 is implemented as a post-relational database. Other variations may also be envisioned and will become apparent to the person skilled in the art of the present technology.

Broadly speaking, the database 204 is an organized collection of data. In some embodiments, the database 204 comprises a collection of data in accordance with a data model, for example a collection of data tables each comprising one or more rows and one or more column of data such as the collection of data tables depicted at FIG. 4. Other variations as to how the database 204 may be structured are also possible and will become apparent to the person skilled in the art of the present technology. The database 204 may be structured so as to store multiple types of data. For example, but without being limitative, the database 204 may contain administrative information, financial information, technical information, file system information. The database 204 may also be used to store document files and/or folder files in accordance with a hierarchical file system such as the documents files and folder files of FIG. 3. What the database 204 may contain and/or the format of the data it may contain is not limitative. Accordingly, this aspect is not limitative and multiple variations may become apparent to the person skilled in the art of the present technology. In some embodiments, the database 204 may comprise the data itself (e.g., a content of a file) and/or metadata associated with the data (e.g., a name of a file). In some embodiments, the database 204 may rely on permanent and/or non-permanent memories (e.g., the solid-state drive 120 or the random access memory 130) to store permanently or temporarily the data contained in the database 204.

Figure 3:
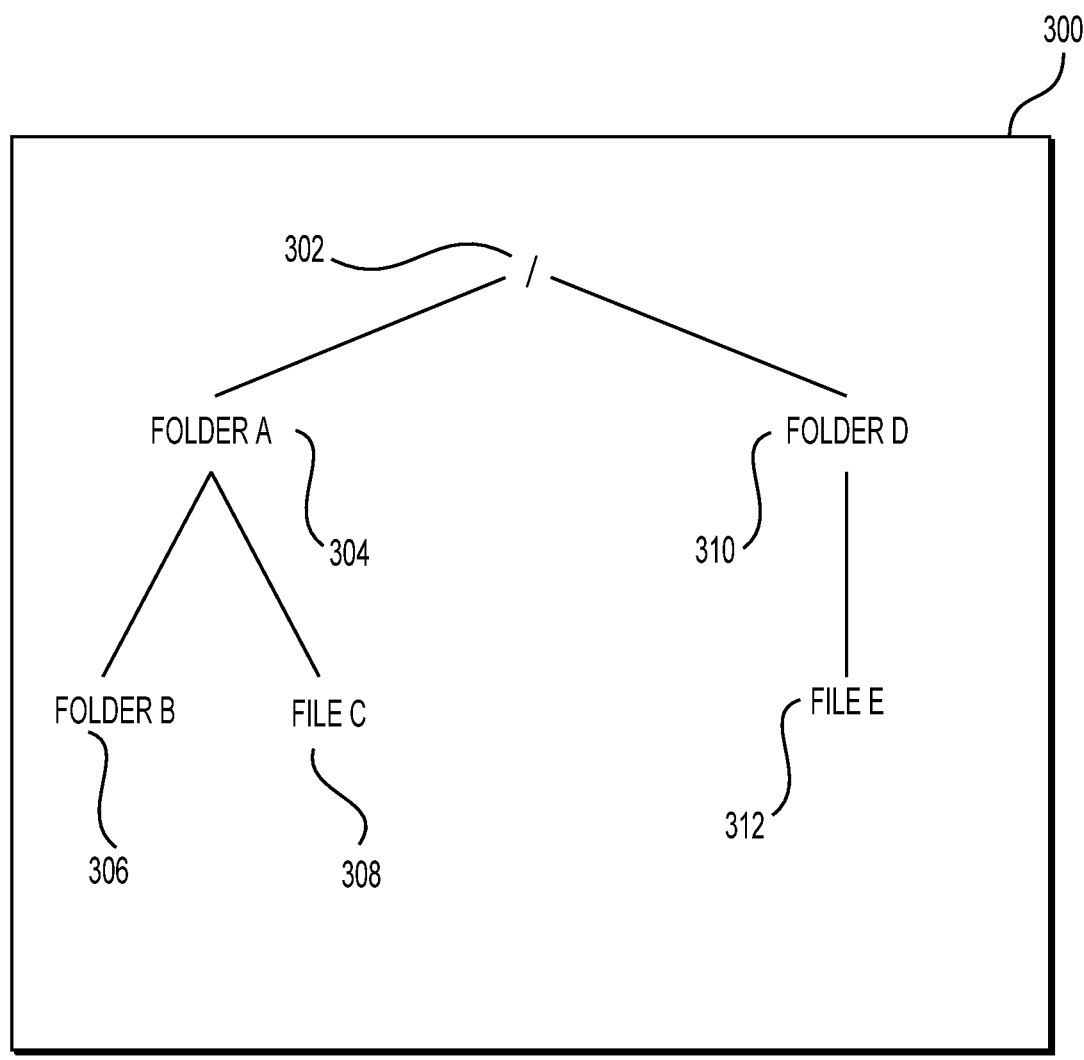
FIG. 3 is a diagram illustrating of a typical file system.
Figure 4:
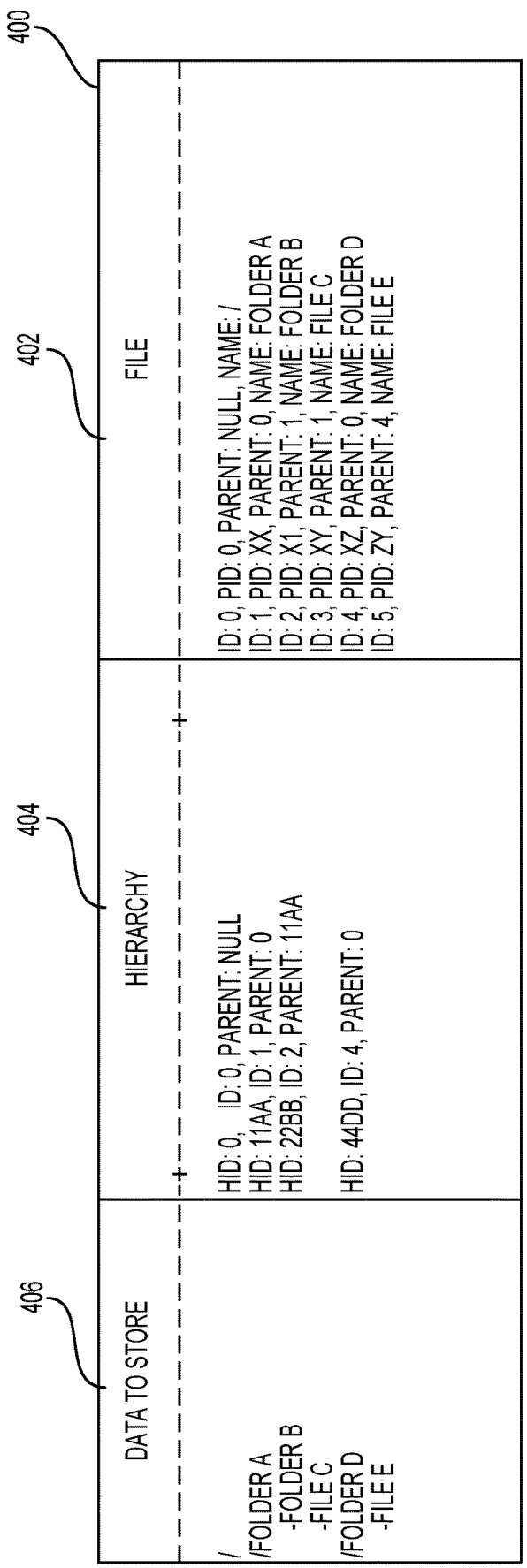
FIG. 4 is a diagram illustrating a hierarchy table and a file table in accordance with an embodiment of the present technology.

Turning now to FIG. 4, a diagram 400 illustrating a hierarchy table 404 and a file table 402 in accordance with an embodiment of the present technology is shown. In an embodiment, the hierarchy table 404 and the file table 402 are stored in the database 204. In other embodiments, the hierarchy table 404 and the file table 402 are each stored in different databases. In the embodiments shown at FIG. 4, the hierarchy table 404 and the file table 402 store data and information related to data detailed in a table "Data to Store" 406. The table 406 details data modelizing the file system 300 illustrated at FIG. 3. In some embodiments, the hierarchy table 404 and the file table 402 may allow to maintain and to "reconstruct" hierarchical relationships between directory files and/or document files as illustrated at FIG. 3. In some embodiments, the hierarchy table 404 may allow to store, for each element, information relating to a hierarchical relationship between the element and other element(s) while the file table 402 may allow to store, for each element, information relating to the element itself, independently of its relationship with other element(s). As a result, in some embodiments, the hierarchy table 404 may comprise a hierarchy structure and the file table 402 may comprise a data structure.

In some embodiments, the hierarchy table 404 may only comprise elements that have a parent-child relationship with another element or other elements. As an example, the hierarchy table 404 may only comprise elements associated with one or more child elements. In such embodiments, the elements may also be referred to as a "node" of a tree structure. In some embodiments, a path defines a relationship between a file (i.e., a directory file or a document file) and a hierarchical data structure. The path may comprise a sequence of path elements, each one of the path elements defining a node in the hierarchical data structure. For example, the folder 304 is a path element of a path defined by the concatenation of the root directory 302, the folder 304 and the folder 306. Referring concurrently to FIG. 3 and FIG. 4, the hierarchy table 404 only comprise entries for the root directory 302 (i.e., "/"), the folder 304 (i.e., "folder A"), the folder 306 (i.e., "folder B) and folder 310 (i.e., "folder D").

In some embodiments, the hierarchy table 404 may comprise, for each element, multiple information components. In some embodiments, each element (e.g., the root directory 302) may be a path element (i.e., an element having at least one child in the hierarchical data structure such as a directory file) associated with (i) a hierarchy identifier associated with a sub-path to the path element in the hierarchical data structure. The hierarchy identifier may depend on a path to the element defined as the sub-path to the path element. The words "sub-path" is used in the description to ease distinction between a partial path associated with an element having one or more children from a path associated with an element defining a leaf of the hierarchical data structure. It should however be underlined that "sub-path" should not be construed limitatively and that "sub-path" may equally be replaced by "path" without departing from the scope of the present technology. As an example, the folder 306 may have a hierarchy identifier associated with a sub-path "/folder A/" defining a path from the root folder 302 to the folder 306. In some embodiments, the sub-path may be defined as starting from a root folder. In some other embodiments, the sub-path may be defined as starting from a non-root folder. In addition, in some embodiments, the hierarchy identifier may be generated by applying a hash function to the sub-path (or path) associated to the path element. The hash function may be selected from any hash functions that may become apparent to the person skilled in the art of the present technology. In the embodiment illustrated at FIG. 4, the hierarchy identifier is referred to as "hid". As an example, a hid value associated with the root folder 302 is "0", a hid value associated with the folder 304 is "11aa", a hid value associated with the folder 306 is "22bb" and a hid value associated with the folder 310 is "44dd".

In some embodiments, each element (e.g., the root directory 302) may also be associated with (ii) an independent hierarchy table identifier uniquely identifying the path element in the hierarchy table 404. In some embodiments, a value representative of the independent hierarchy table identifier may be an integer but multiple variations may be equally applied without departing from the scope of the present technology and will become apparent to the person skilled in the art of the present technology. In the embodiment illustrated at FIG. 4, the independent hierarchy table identifier is referred to as "id". As an example, an id value associated with the root folder 302 is "0", an id value associated with the folder 304 is "1", an id value associated with the folder 306 is "2" and an id value associated with the folder 310 is "4".

In some embodiments, each element (e.g., the root directory 302) may also be associated with (iii) a parent hierarchy table identifier associated with a hierarchy identifier of a parent path element from which the element depends. In some embodiments, a value representative of the parent hierarchy identifier may be a value associated with the corresponding hierarchy identifier of the corresponding parent (e.g., a corresponding hash value) but multiple variations may be equally applied without departing from the scope of the present technology and will become apparent to the person skilled in the art of the present technology. In some embodiments, the parent hierarchy table identifier may be a link to the parent path element. In the embodiment illustrated at FIG. 4, the parent hierarchy table identifier is referred to as "parent". As an example, a parent value associated with the root folder 302 is "NULL", a parent value associated with the folder 304 is "0", a parent value associated with the folder 306 is "11aa" and a parent value associated with the folder 310 is "0".

In some embodiments, the file table 402 may comprise elements that have parent-child and/or child-parent relationships with one or more other elements. As an example, the file table 402 may comprise elements having a parent-child relationship (i.e., an element associated with a child element) and/or elements having a child-parent relationship (i.e., an element associated with a parent element). In such embodiments, the elements may be referred to as a "node" (i.e., an element associated with a child element) or a "leaf" (i.e., an element only associated with a parent element) of a tree structure. For example, the file table 402 may comprise elements representative of a path element (e.g., a directory file) and/or elements representative of a file (e.g., a directory file or as a document file). Referring concurrently to FIG. 3 and FIG. 4, the file table 402 comprises entries for the root directory 302 (i.e., "/"), the folder 304 (i.e., "folder A"), the folder 306 (i.e., "folder B), folder 310 (i.e., "folder D") and also for the file 308 (i.e., "file C") and the file 312 (i.e., "file E").

In some embodiments, the file table 402 may comprise, for each element, multiple information components. In some embodiments, each element (e.g., the root directory 302, the file 308) may be a path element (i.e., an element having at least one child in the hierarchical data structure such as a directory file) or a file (i.e., an element having at least one child in the hierarchical data structure such as a directory file or an element that is not a parent of another element such as a document file). Each element may be associated with (i) an independent file table identifier uniquely identifying the path element or the file in the file table 402. In some embodiments, a value representative of the independent file table identifier may be an integer but multiple variations may be equally applied without departing from the scope of the present technology and will become apparent to the person skilled in the art of the present technology. In some embodiments, the independent file table identifier of the file table 402 may be identical to the corresponding independent hierarchy table identifier of the hierarchy table 404. In the embodiment illustrated at FIG. 4, the independent file table identifier is referred to as "id". As an example, an id value associated with the root folder 302 is "0", an id value associated with the folder 304 is "1", an id value associated with the folder 306 is "2", an id value associated with the file 308 is "3", an id value associated with the folder 310 is "4" and an id value associated with the file 312 is "5".

In some embodiments, each element (e.g., the root directory 302 or the file 308) may also be associated with (ii) a parent file table identifier associated with an independent file table identifier of a parent path element from which the element depends. In some embodiments, a value representative of the parent file table identifier may be a value associated with the corresponding independent file table identifier but multiple variations may be equally used without departing from the scope of the present technology and will become apparent to the person skilled in the art of the present technology. In some embodiments, the parent file table identifier may be a link to the parent path element. In the embodiment illustrated at FIG. 4, the parent file table identifier is referred to as "parent". As an example, a parent value associated with the root folder 302 is "NULL", a parent value associated with the folder 304 is "0", a parent value associated with the folder 306 is "1", a parent value associated with the file 308 is "1", a parent value associated with the folder 310 is "0" and a parent value associated with the file 312 is "4".

In some embodiments, each element (e.g., the root directory 302 or the file 308) may also be associated with (iii) an independent parent file table identifier associated with an independent file table identifier associated with a parent path element from which the path elements or the file depends. In some embodiments, the independent parent file table identifier may also be associated with a name associated with the independent file table identifier associated with the parent path element from which the path elements or the file depends. In addition, in some embodiments, the independent parent file table identifier may be generated by applying a hash function to the independent file table identifier associated with a parent path element from which the path elements or the file depends and/or to the name associated with a parent path element from which the path elements or the file depends. The hash function may be selected from any hash functions that may become apparent to the person skilled in the art of the present technology. In the embodiment illustrated at FIG. 4, the independent parent file table identifier is referred to as "pid". As an example, a pid value associated with the root folder 302 is "0", a pid value associated with the folder 304 is "xx", a pid value associated with the folder 306 is "x1", a pid value associated with the file 308 is "xy", a pid value associated with the folder 310 is "xz" and a pid value associated with the file 312 is "zy".

In some embodiments, each element (e.g., the root directory 302 or the file 308) may also be associated with (iv) a text stream defining a name associated with the at least one of the path elements and the file. In the embodiment illustrated at FIG. 4, the text stream is referred to as "name". As an example, a text stream associated with the root folder 302 is "/", a text stream associated with the folder 304 is "folder A", a text stream associated with the folder 306 is "folder B", a text stream associated with the file 308 is "file C", a text stream associated with the folder 310 is "folder D" and a text stream associated with the file 312 is "file E".

As a result of the data structure depicted in the paragraphs above, a method to retrieve data stored in the hierarchical table 404 and the file table 402 may be carried out by relying on a path (or a sub-path). For example, a retrieval of the file 308 (i.e., "file C") may be carried out by generating a hierarchy identifier based on a path associated with the file 308. In this particular example, the hierarchy identifier may be generated based on the path "/folder A/". In some embodiments, the hierarchy identifier may be generated by applying a hash function to the path. In this example, the hierarchy identifier based on the hashed path is "11aa". Next, a hierarchy identifier of the hierarchy table 404 corresponding to "11aa" is identified. In this example, the entry corresponding to "folder A" is retrieved. Then, a corresponding independent hierarchy table identifier of the hierarchy table 404 (i.e., "1") is relied upon to identify, in the file table 402, one or more entries having a parent file table identifier corresponding to the parent hierarchy table identifier associated with the entry corresponding to the hierarchy identifier. In this example, the method may identify the folder 306 or the file 308 as having parent hierarchy table identifier having a value of "1". Next, the file 308 may be identified, for example, by looking up at the text stream corresponding to "file C".

In addition, also as a result of the data structure depicted in the paragraphs below, a method to modify a hierarchical structure further to a displacement of a directory file may be carried out by only updating the hierarchy table 404, without having to update the file table 402. In some embodiments, such displacement may be reflected in the hierarchy table 404 by updating the corresponding hierarchy identifier and/or the corresponding parent hierarchy table identifier. In some embodiments, because of the data structure depicted in the paragraphs below, entries of the file table 402 corresponding to child elements dependent from the directory file to be moved do not need to be updated thereby reducing a computational complexity and/or an amount of time required to complete such an update in the database hosting the hierarchy table 404 and/or the file table 402.

Figure 6:
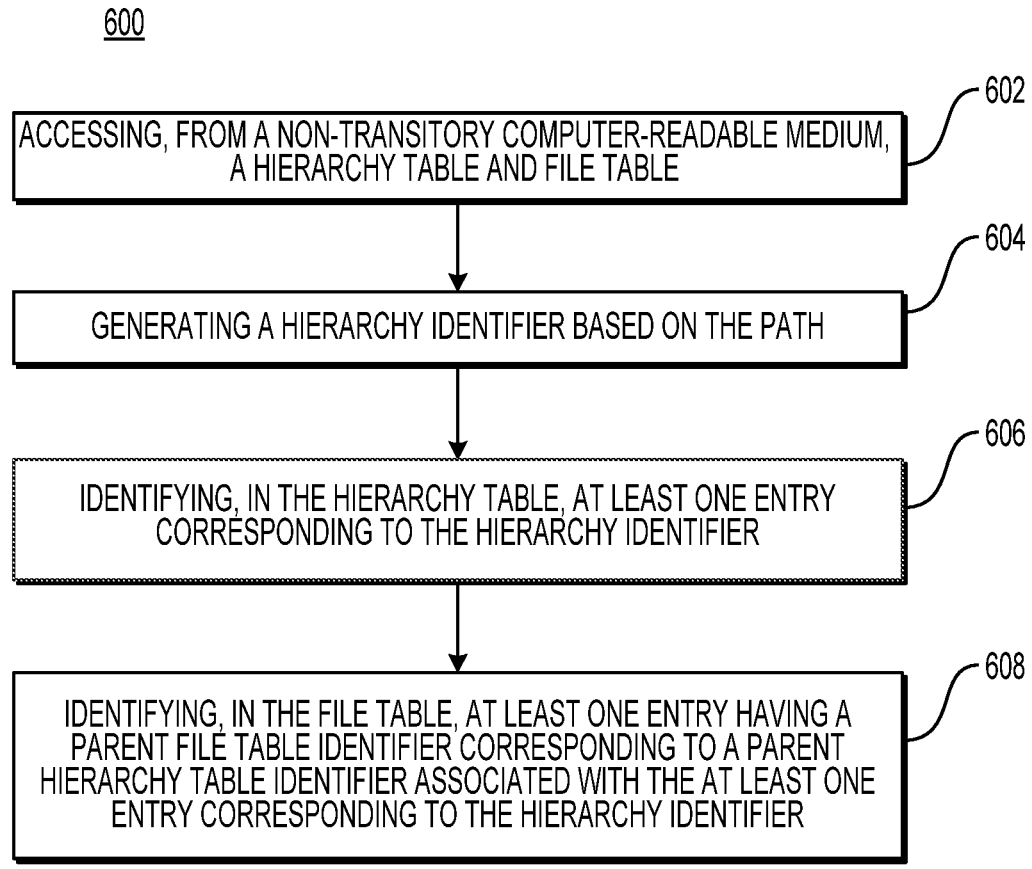
FIG. 6 is a flowchart illustrating a second computer-implemented method implementing embodiments of the present technology.
Figure 7:
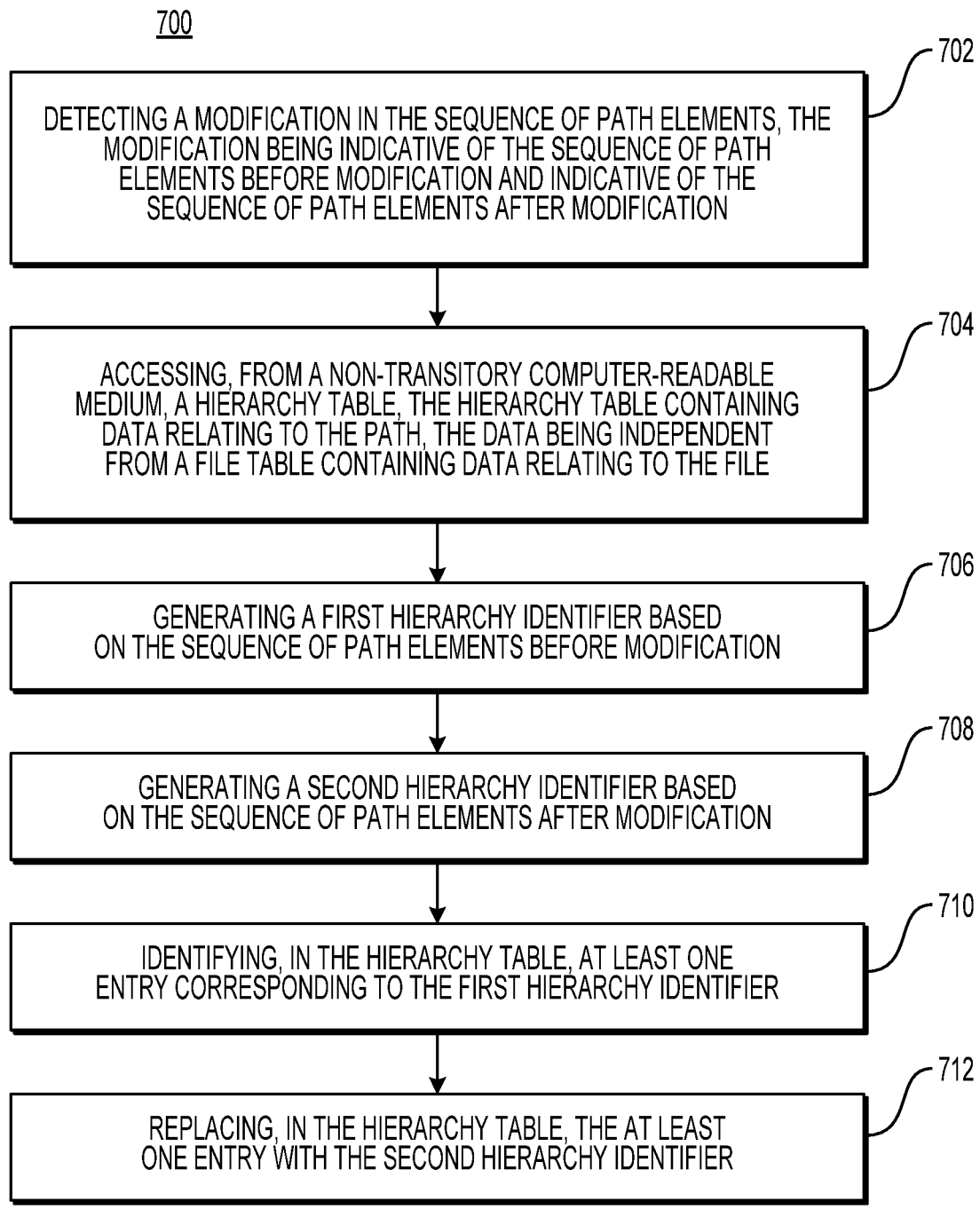
FIG. 7 is a flowchart illustrating a third computer-implemented method implementing embodiments of the present technology.

Having described, with reference to FIG. 1 to FIG. 4, some non-limiting example instances of systems and computer-implemented methods used in connection with the problem of processing a document in a distributed architecture, we shall now describe a general solution to this problem with references to FIG. 5 to FIG. 7.

More specifically, FIG. 5 shows a flowchart illustrating a first computer-implemented method 500 implementing embodiments of the present technology. The computer-implemented method of FIG. 5 may comprise a computer-implemented method executable by a processor of the database server 202, the method comprising a series of steps to be carried out by the database server 202.

The computer-implemented method of FIG. 5 may be carried out, for example, in the context of the database server 202 by the processor 110 executing program instructions having been loaded into random access memories 130 from solid-state drives 120 of the database server 202.

The method 500 allows storing data associated with a path and a file, the path defining a relationship between the file and a hierarchical data structure, the path comprising a sequence of path elements, each one of the path elements defining a node in the hierarchical data structure. The method 500 starts at a step 502 by accessing, from a non-transitory computer-readable medium, the data. Then, at a step 504, for at least one of the path elements associated with the data, the method 500 stores, in a hierarchy table accessible from the non-transitory computer-readable medium, (i) a hierarchy identifier associated with a sub-path to the at least one of the path elements in the hierarchical data structure; (ii) an independent hierarchy table identifier uniquely identifying the at least one of the path elements in the hierarchy table; and (iii) a parent hierarchy table identifier associated with a hierarchy identifier of a parent path element from which the at least one of the path elements depends.

At a step 506, for at least one of the path elements and the file associated with the data, the method 500 stores, in a file table accessible from the non-transitory computer-readable medium, (i) an independent file table identifier uniquely identifying the at least one of the path elements and the file in the file table; (ii) a parent file table identifier associated with an independent file table identifier of a parent path element from which the at least one of the path elements and the file depends.

In some embodiments, the hierarchy identifier is generated by applying a hash function to the sub-path. In yet some embodiments, the sub-path is a complete path between a root of the hierarchical data structure and the node defined by the at least one of the path elements.

In some embodiments, the method 500 further comprises for the at least one of the path elements and the file associated with the data, storing, in the file table accessible from the non-transitory computer-readable medium, (iii) an independent parent file table identifier associated with an independent file table identifier associated with a parent path element from which the at least one of the path elements and the file depends.

The method 500 may also further comprise, for the at least one of the path elements and the file associated with the data, storing, in the file table accessible from the non-transitory computer-readable medium, (iv) a text stream defining a name associated with the at least one of the path elements and the file.

In some embodiments, the parent file table identifier is generated based on (i) the independent file table identifier associated with the parent path element and (ii) a name associated with the at least one of the path elements and the file. In some embodiments, the at least one of the path elements is a directory file. In some embodiments, the file defines a leaf in the hierarchical structure and the directory file defines a node in the hierarchical structure. In some embodiments, the hierarchy table and the file table are implemented via a relational database.

FIG. 6 shows a flowchart illustrating a second computer-implemented method 600 implementing embodiments of the present technology. The computer-implemented method of FIG. 6 may comprise a computer-implemented method executable by a processor of the database server 202, the method comprising a series of steps to be carried out by the database server 202.

As for the computer-implemented method of FIG. 5, the computer-implemented method of FIG. 6 may be carried out, for example, in the context of the database server 202 by the processor 110 executing program instructions having been loaded into random access memories 130 from solid-state drives 120 of the database server 202.

The method 600 allows retrieving data associated with a path and a file, the path defining a relationship between the file and a hierarchical data structure, the path comprising a sequence of path elements, each one of the path elements defining a node in the hierarchical data structure. The method 600 starts at step 602 by accessing, from a non-transitory computer-readable medium, a hierarchy table and file table. Then, at a step 604, the method 600 generates a hierarchy identifier based on the path. At a step 606, the method 600 proceeds by identifying, in the hierarchy table, at least one entry corresponding to the hierarchy identifier. Then, at a step 608, the method 600 proceeds by identifying, in the file table, at least one entry having a parent file table identifier corresponding to a parent hierarchy table identifier associated with the at least one entry corresponding to the hierarchy identifier.

In some embodiments, generating the hierarchy identifier comprises applying a hash function to the path. Also, in some embodiments, the hierarchy table is structured so that: (i) the hierarchy identifier is associated with a sub-path to one of the path elements in the hierarchical data structure; (ii) an independent hierarchy table identifier uniquely identifies the one of the path elements in the hierarchy table; and (iii) the parent hierarchy table identifier is associated with a hierarchy identifier of a parent path element from which the one of the path elements depends.

In some embodiments, the file table is structured so that: (i) an independent file table identifier uniquely identifies one of the path elements and the file in the file table; and (ii) the parent file table identifier is associated with an independent file table identifier of a parent path element from which the one of the path elements and the file depends.

FIG. 7 shows a flowchart illustrating a third computer-implemented method 700 implementing embodiments of the present technology. The computer-implemented method of FIG. 7 may comprise a computer-implemented method executable by a processor of the database server 202, the method comprising a series of steps to be carried out by the database server 202.

As for the computer-implemented methods of FIG. 5 and FIG. 6, the computer-implemented method of FIG. 7 may be carried out, for example, in the context of the database server 202 by the processor 110 executing program instructions having been loaded into random access memories 130 from solid-state drives 120 of the database server 202.

The method 700 allows updating data associated with a path and a file, the path defining a relationship between the file and a hierarchical data structure, the path comprising a sequence of path elements, each one of the path elements defining a node in the hierarchical data structure. The method 700 starts at step 702 by detecting a modification in the sequence of path elements, the modification being indicative of the sequence of path elements before modification and indicative of the sequence of path elements after modification. Then, at step 704, accessing, from a non-transitory computer-readable medium, a hierarchy table, the hierarchy table containing data relating to the path, the data being independent from a file table containing data relating to the file.

At a step 706, the method 700 generates a first hierarchy identifier based on the sequence of path elements before modification. The method 700 then pursues with step 708 by generating a second hierarchy identifier based on the sequence of path elements after modification. At a step 710, the method 700 identifies, in the hierarchy table, at least one entry corresponding to the first hierarchy identifier. At a step 712, the method 700 proceeds by replacing, in the hierarchy table, the at least one entry with the second hierarchy identifier.

In some embodiments, updating data associated with a path and a file is performed without modifying a content of the file table. In some embodiments, the hierarchy table is structured so that: (i) a hierarchy identifier is associated with a sub-path to one of the path elements in the hierarchical data structure; (ii) an independent hierarchy table identifier uniquely identifies one of the path elements in the hierarchy table; and (iii) a parent hierarchy table identifier is associated with a hierarchy identifier of a parent path element from which the one of the path elements depends.

While the above-described implementations have been described and shown with reference to particular steps performed in a particular order, it will be understood that these steps may be combined, sub-divided, or re-ordered without departing from the teachings of the present technology. Accordingly, the order and grouping of the steps is not a limitation of the present technology.

As such, the methods and systems implemented in accordance with some non-limiting embodiments of the present technology can be represented as follows, presented in numbered clauses.

[Clause 1] A computer-implemented method of storing data associated with a path and a file (500), the path defining a relationship between the file and a hierarchical data structure, the path comprising a sequence of path elements, each one of the path elements defining a node in the hierarchical data structure, the method for execution by a processor (110), the method comprising:
  accessing, from a non-transitory computer-readable medium (120, 130), the data;
  for at least one of the path elements associated with the data, storing, in a hierarchy table (404) accessible from the non-transitory computer-readable medium (120, 130), (i) a hierarchy identifier associated with a sub-path to the at least one of the path elements in the hierarchical data structure; (ii) an independent hierarchy table identifier uniquely identifying the at least one of the path elements in the hierarchy table (404); and (iii) a parent hierarchy table identifier associated with a hierarchy identifier of a parent path element from which the at least one of the path elements depends; and
  for at least one of the path elements and the file associated with the data, storing, in a file table (402) accessible from the non-transitory computer-readable medium (120, 130), (i) an independent file table identifier uniquely identifying the at least one of the path elements and the file in the file table (402); and (ii) a parent file table identifier associated with an independent file table identifier of a parent path element from which the at least one of the path elements and the file depends.

[Clause 2] The method of clause 1, wherein the hierarchy identifier is generated by applying a hash function to the sub-path.

[Clause 3] The method of clause 1, wherein the sub-path is a complete path between a root of the hierarchical data structure and the node defined by the at least one of the path elements.

[Clause 4] The method of clause 1, further comprising, for the at least one of the path elements and the file associated with the data, storing, in the file table (402) accessible from the non-transitory computer-readable medium (120, 130), (iii) an independent parent file table identifier associated with an independent file table identifier associated with a parent path element from which the at least one of the path elements and the file depends.

[Clause 5] The method of clause 4, further comprising, for the at least one of the path elements and the file associated with the data, storing, in the file table (402) accessible from the non-transitory computer-readable medium (120, 130), (iv) a text stream defining a name associated with the at least one of the path elements and the file.

[Clause 6] The method of clause 4, wherein the parent file table identifier is generated based on (i) the independent file table identifier associated with the parent path element and (ii) a name associated with the at least one of the path elements and the file.

[Clause 7] The method of clause 1, wherein the at least one of the path elements is a directory file.

[Clause 8] The method of clause 7, wherein the file defines a leaf in the hierarchical structure and the directory file defines a node in the hierarchical structure.

[Clause 9] The method of clause 1, wherein the hierarchy table (404) and the file table (402) are implemented via a relational database.

[Clause 10] A computer-implemented method of retrieving data associated with a path and a file (600), the path defining a relationship between the file and a hierarchical data structure, the path comprising a sequence of path elements, each one of the path elements defining a node in the hierarchical data structure, the method for execution by a processor (110), the method comprising:

accessing, from a non-transitory computer-readable medium (120, 130), a hierarchy table (404) and file table (402);

generating a hierarchy identifier based on the path;

identifying, in the hierarchy table (404), at least one entry corresponding to the hierarchy identifier; and identifying, in the file table (402), at least one entry having a parent file table identifier corresponding to a parent hierarchy table identifier associated with the at least one entry corresponding to the hierarchy identifier.

[Clause 11] The method of clause 10, wherein generating the hierarchy identifier comprises applying a hash function to the path.

[Clause 12] The method of clause 10, wherein the hierarchy table (404) is structured so that:

(i) the hierarchy identifier is associated with a sub-path to one of the path elements in the hierarchical data structure;

(ii) an independent hierarchy table identifier uniquely identifies the one of the path elements in the hierarchy table (404); and (iii) the parent hierarchy table identifier is associated with a hierarchy identifier of a parent path element from which the one of the path elements depends.

[Clause 13] The method of clause 10, wherein the file table (402) is structured so that:

(i) an independent file table identifier uniquely identifies one of the path elements and the file in the file table (402); and (ii) the parent file table identifier is associated with an independent file table identifier of a parent path element from which the one of the path elements and the file depends.

[Clause 14] A computer-implemented method of updating data associated with a path and a file (700), the path defining a relationship between the file and a hierarchical data structure, the path comprising a sequence of path elements, each one of the path elements defining a node in the hierarchical data structure, the method for execution by a processor (110), the method comprising:

detecting a modification in the sequence of path elements, the modification being indicative of the sequence of path elements before modification and indicative of the sequence of path elements after modification;

accessing, from a non-transitory computer-readable medium (120, 130), a hierarchy table (404), the hierarchy table (404) containing data relating to the path, the data being independent from a file table containing data relating to the file;

generating a first hierarchy identifier based on the sequence of path elements before modification;

generating a second hierarchy identifier based on the sequence of path elements after modification;

identifying, in the hierarchy table (404), at least one entry corresponding to the first hierarchy identifier; and replacing, in the hierarchy table (404), the at least one entry with the second hierarchy identifier.

[Clause 15] The method of clause 14, wherein updating data associated with a path and a file is performed without modifying a content of the file table (402).

[Clause 16] The method of clause 14, wherein the hierarchy table (404) is structured so that:

(i) a hierarchy identifier is associated with a sub-path to one of the path elements in the hierarchical data structure;

(ii) an independent hierarchy table identifier uniquely identifies one of the path elements in the hierarchy table (404); and (iii) a parent hierarchy table identifier is associated with a hierarchy identifier of a parent path element from which the one of the path elements depends.

[Clause 17] A computer-implemented system configured to perform the method of any one of clauses 1 to 16.

[Clause 18] A non-transitory computer-readable medium comprising computer-executable instructions that cause a system to execute the method according to any one of clauses 1 to 17.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Some of these steps and signal sending-receiving are well known in the art and, as such, have been omitted in certain portions of this description for the sake of simplicity. The signals can be sent-received using optical means (such as a fibre-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A computer-implemented method of storing data associated with a path and a file, the path defining a relationship between the file and a hierarchical data structure, the hierarchical data structure defining a relationship between a root and one or more leaves, the path comprising a sequence of path elements, each one of the path elements defining a node in the hierarchical data structure, the method for execution by a processor, the method comprising:

accessing, from a non-transitory computer-readable medium, the data;

for at least one of the path elements associated with the data, storing, in a hierarchy table accessible from the non-transitory computer-readable medium, (i) a hierarchy identifier associated with a sub-path to the at least one of the path elements in the hierarchical data structure; (ii) an independent hierarchy table identifier uniquely identifying the at least one of the path elements in the hierarchy table; and (iii) a parent hierarchy table identifier associated with a hierarchy identifier of a parent path element from which the at least one of the path elements depends, the hierarchy table only comprising hierarchical relationships between elements that can be associated with one or more child elements, each entry line of the hierarchy table being free of information relating to the one or more child elements themselves; and for the at least one of the path elements and the file associated with the data, storing, in a file table accessible from the non-transitory computer-readable medium, (i) an independent file table identifier uniquely identifying the at least one of the path elements and the file in the file table; and (ii) a parent file table identifier associated with an independent file table identifier of a parent path element from which the at least one of the path elements and the file depends, the file table being configured to store information relating to the one or more child elements themselves; the storing for enabling retrieving at least one child element of at least one parent path element associated with the data by:

generating, based on a path to the at least one parent path element, a hierarchy identifier associated with the at least one parent path element;
determining, based on the hierarchy identifier, in the hierarchy table, an independent hierarchy table identifier associated with the at least one parent path element;
identifying, in the file table, the at least one child element as an element having a parent file table identifier equal to the independent hierarchy table identifier associated with the parent path element in the hierarchy table;
in response to a displacement of the at least one parent path element, the displacement being indicative of a new path to the at least one parent path element, the at least one parent path element having at least one child element, updating the hierarchy table by generating a new hierarchy identifier for the at least one parent path element based on the new path to the at least one parent path element, the updating the hierarchy table being executed without updating an entry corresponding to the at least one child element in the file table.

2. The method of claim 1, wherein the hierarchy identifier is generated by applying a hash function to the sub-path.

3. The method of claim 1, wherein the sub-path is a complete path between the root of the hierarchical data structure and the node defined by the at least one of the path elements.

4. The method of claim 1, further comprising, for the at least one of the path elements and the file associated with the data, storing, in the file table accessible from the non-transitory computer-readable medium, (iii) an independent parent file table identifier associated with an independent file table identifier associated with a parent path element from which the at least one of the path elements and the file depends.

5. The method of claim 4, further comprising, for the at least one of the path elements and the file associated with the data, storing, in the file table accessible from the non-transitory computer-readable medium, (iv) a text stream defining a name associated with the at least one of the path elements and the file.

6. The method of claim 4, wherein the parent file table identifier is generated based on (i) the independent file table identifier associated with the parent path element and (ii) a name associated with the at least one of the path elements and the file.

7. The method of claim 1, wherein the at least one of the path elements is a directory file.

8. The method of claim 7, wherein the file defines a leaf in the hierarchical structure and the directory file defines a node in the hierarchical structure.

9. The method of claim 1, wherein the hierarchy table and the file table are implemented via a relational database.

10. A computer-implemented method of retrieving data associated with a path and a file, the path defining a relationship between the file and a hierarchical data structure, the hierarchical data structure defining a relationship between a root and one or more leaves, the path comprising a sequence of path elements, each one of the path elements defining a node in the hierarchical data structure, the method for execution by a processor, the method comprising:

accessing, from a non-transitory computer-readable medium, a hierarchy table and a file table, each of the hierarchy table and the file table having entries associated with at least one path element associated with the data, the hierarchy table only comprising hierarchical relationships between elements that can be associated with one or more child elements, each entry line of the hierarchy table being free of information relating to the one or more child elements themselves, the file table being configured to store information relating to the one or more child elements themselves;
generating, based on a path to at least one parent path element, the parent path element having at least one child element, a hierarchy identifier associated with the at least one parent path element;
determining, based on the hierarchy identifier, in the hierarchy table, an independent hierarchy table identifier associated with the at least one parent path element;
identifying, in the file table, the at least one child element as an element having a parent file table identifier equal to the independent hierarchy table identifier associated with the parent path element in the hierarchy table; and
identifying, in the file table, the at least one child element having a parent file table identifier equal to the independent hierarchy table identifier associated with the parent path element in the hierarchy tables;
in response to a displacement of the at least one parent path element, the displacement being indicative of a new path to the at least one parent path element, the at least one parent path element having at least one child element, updating the hierarchy table by generating a new hierarchy identifier for the at least one parent path element based on the new path to the at least one parent path element, the updating the hierarchy table being executed without updating an entry corresponding to the at least one child element in the file table.

11. The method of claim 10, wherein generating the hierarchy identifier comprises applying a hash function to the path.

12. The method of claim 10, wherein the hierarchy table is structured so that:
(i) the hierarchy identifier is associated with a sub-path to one of the path elements in the hierarchical data structure;
(ii) an independent hierarchy table identifier uniquely identifies the one of the path elements in the hierarchy table; and
(iii) the parent hierarchy table identifier is associated with a hierarchy identifier of a parent path element from which the one of the path elements depends.

13. The method of claim 10, wherein the file table is structured so that:
(i) an independent file table identifier uniquely identifies one of the path elements and the file in the file table; and (ii) the parent file table identifier is associated with an independent file table identifier of a parent path element from which the one of the path elements and the file depends.

14. A computer-implemented method of updating data associated with a path and a file, the path defining a relationship between the file and a hierarchical data structure, the hierarchical data structure defining a relationship between a root and one or more leaves, the path comprising a sequence of path elements, each one of the path elements defining a node in the hierarchical data structure, the method for execution by a processor, the method comprising:

detecting a modification in the sequence of path elements, the modification being indicative of the sequence of path elements before modification and indicative of the sequence of path elements after modification;

accessing, from a non-transitory computer-readable medium, a hierarchy table only comprising hierarchical relationships between elements that can be associated with one or more child elements, each entry line of the hierarchy table being free of information relating to the one or more child elements themselves, the hierarchy table containing data relating to the path, the data being independent from a file table containing data relating to the file;

generating a first hierarchy identifier based on the sequence of path elements before modification, each of the sequence of path elements in the hierarchy table being a parent path element having at least one child element;

generating a second hierarchy identifier based on the sequence of path elements after modification;

identifying, in the hierarchy table, at least one parent path element corresponding to the first hierarchy identifier, the at least one parent path element being associated with the data and having at least one child element, an entry corresponding to the at least one child element being stored in the file table; and replacing, in the hierarchy table, for the at least one parent path element, the first hierarchy identifier with the second hierarchy identifier, thereby defining a new path to the at least one parent path identifier, the replacing being executed without updating the entry corresponding to the at least one child element in the file table.

15. The method of claim 14, wherein the hierarchy table is structured so that:

(i) a hierarchy identifier is associated with a sub-path to one of the path elements in the hierarchical data structure;

(ii) an independent hierarchy table identifier uniquely identifies one of the path elements in the hierarchy table; and (iii) a parent hierarchy table identifier is associated with a hierarchy identifier of a parent path element from which the one of the path elements depends.

\* \* \* \* \*